(12) United States Patent
Steelberg et al.

(10) Patent No.: US 9,854,277 B2
(45) Date of Patent: Dec. 26, 2017

(54) SYSTEM AND METHOD FOR CREATION AND MANAGEMENT OF ADVERTISING INVENTORY USING METADATA

(71) Applicant: VERITONE, INC., Newport Beach, CA (US)

(72) Inventors: Ryan Steelberg, Irvine, CA (US); Chad Steelberg, Newport Beach, CA (US)

(73) Assignee: VERITONE, INC., Newport Beach, CA (US)

( * ) Notice: Subject to any disclaimer, the term of this patent is extended or adjusted under 35 U.S.C. 154(b) by 0 days.

(21) Appl. No.: 15/076,615

(22) Filed: Mar. 21, 2016

(65) Prior Publication Data
US 2016/0295255 A1    Oct. 6, 2016

Related U.S. Application Data (63) Continuation of application No. 11/981,839, filed on Oct. 31, 2007, now Pat. No. 9,294,727.

(51) Int. Cl.
*H04N 21/234*    (2011.01)
*G06Q 30/02*    (2012.01)
(Continued)

(52) U.S. Cl.
CPC ....... *H04N 21/23424* (2013.01); *G06Q 30/02* (2013.01); *G06Q 30/0276* (2013.01);
(Continued)

(58) Field of Classification Search
CPC ........ H04N 7/16; H04N 21/84; H04N 21/266; H04N 21/812; H04N 21/23424;
(Continued)

(56) References Cited

U.S. PATENT DOCUMENTS 6,026,376 A    2/2000  Kenney
6,141,657 A    10/2000 Rothberg et al.
(Continued)

FOREIGN PATENT DOCUMENTS

WO    WO 2007/029881 A2    3/2007

OTHER PUBLICATIONS

Garthwaite, C., et al., "The Role of Celebrity Endorsements in Politics: Oprah, Obama, and the 2008 Democratic Primary," Department of Economics, University of Maryland, Sep. 2008, pp. 1-59.
(Continued)

*Primary Examiner* — Chenea Smith
(74) *Attorney, Agent, or Firm* — One LLP (57) ABSTRACT

The invention is directed to a system and method for the creation and management of advertising inventory utilizing associated metadata. The system generally includes a media streaming system that is used with a video player in connection with the playback of at least one audio/video work. The media streaming system includes a media distribution system that supplies metadata associated with the audio/video work to the video player. The metadata has a hierarchical taxonomy that defines a plurality of attributes associated with one or more objects present in the audio/video work. The system also includes an ad inventory engine that determines available ad inventory based on the metadata and matches the available inventory with advertisement data based on the hierarchical taxonomy.

11 Claims, 5 Drawing Sheets

(51) Int. Cl.
   *H04N 7/16*        (2011.01)
   *H04N 21/266*      (2011.01)
   *H04N 21/81*       (2011.01)
   *H04N 21/84*       (2011.01)
   *H04N 21/2387*     (2011.01)
   *H04N 21/472*      (2011.01)
   *H04N 21/61*       (2011.01)

(52) U.S. Cl.
   CPC ........... *G06Q 30/0277* (2013.01); *H04N 7/16* (2013.01); *H04N 21/2387* (2013.01); *H04N 21/266* (2013.01); *H04N 21/47217* (2013.01); *H04N 21/6106* (2013.01); *H04N 21/812* (2013.01); *H04N 21/84* (2013.01)

(58) Field of Classification Search
   CPC ......... H04N 21/2387; H04N 21/47217; H04N 21/6106; G06Q 30/02; G06Q 30/0276; G06Q 30/0277
   See application file for complete search history.

(56) References Cited

U.S. PATENT DOCUMENTS

| | | | |
|---|---|---|---|
| 6,253,188 B1 | 6/2001 | Witek et al. | |
| 6,338,067 B1 | 1/2002 | Baker et al. | |
| 6,496,803 B1 | 12/2002 | Seet et al. | |
| 6,629,081 B1 | 9/2003 | Cornelius et al. | |
| 6,698,020 B1 | 2/2004 | Zigmond | |
| 6,839,681 B1 | 1/2005 | Hotz | |
| 6,907,581 B2 | 6/2005 | Noy | |
| 6,954,728 B1 | 10/2005 | Kusumoto et al. | |
| 7,003,420 B2 | 2/2006 | Ur et al. | |
| 7,058,624 B2 | 6/2006 | Masters | |
| 7,200,565 B2 | 4/2007 | Basson et al. | |
| 7,584,118 B1 | 9/2009 | Bellare et al. | |
| 7,613,691 B2 * | 11/2009 | Finch | G06Q 30/02 |
| 8,122,467 B2 | 2/2012 | Steelberg et al. | |
| 2001/0023436 A1 * | 9/2001 | Srinivasan | G06T 7/2033 709/219 |
| 2001/0037205 A1 | 11/2001 | Joao | |
| 2002/0002488 A1 | 1/2002 | Muyres et al. | |
| 2002/0042738 A1 | 4/2002 | Srinivasan et al. | |
| 2002/0056120 A1 | 5/2002 | McTernan et al. | |
| 2002/0073084 A1 | 6/2002 | Kauffman et al. | |
| 2002/0083468 A1 * | 6/2002 | Dudkiewicz | H04N 21/4755 725/133 |
| 2002/0103698 A1 | 8/2002 | Cantrell | |
| 2002/0120925 A1 * | 8/2002 | Logan | A23L 2/52 725/9 |
| 2002/0123994 A1 | 9/2002 | Schabes et al. | |
| 2002/0141584 A1 | 10/2002 | Razdan et al. | |
| 2002/0178447 A1 | 11/2002 | Plotnick et al. | |
| 2002/0194070 A1 | 12/2002 | Totham et al. | |
| 2003/0023598 A1 | 1/2003 | Janakiraman et al. | |
| 2003/0028873 A1 | 2/2003 | Lemmons | |
| 2003/0078828 A1 | 4/2003 | Basson et al. | |
| 2003/0229507 A1 | 12/2003 | Perge | |
| 2004/0030741 A1 | 2/2004 | Wolton et al. | |
| 2004/0059996 A1 | 3/2004 | Fasciano | |
| 2004/0122735 A1 | 6/2004 | Meshkin | |
| 2004/0143600 A1 | 7/2004 | Musgrove et al. | |
| 2004/0186776 A1 | 9/2004 | Llach | |
| 2004/0216157 A1 | 10/2004 | Shain et al. | |
| 2004/0225647 A1 | 11/2004 | Connelly et al. | |
| 2004/0249700 A1 | 12/2004 | Gross | |
| 2005/0010475 A1 | 1/2005 | Perkowski et al. | |
| 2005/0137939 A1 | 6/2005 | Calabria et al. | |
| 2005/0209909 A1 | 9/2005 | Dull et al. | |
| 2005/0234998 A1 | 10/2005 | Lesandrini et al. | |
| 2006/0004691 A1 | 1/2006 | Sifry | |
| 2006/0026067 A1 | 2/2006 | Nicholas et al. | |
| 2006/0041562 A1 | 2/2006 | Paczkowski et al. | |
| 2006/0069663 A1 | 3/2006 | Adar et al. | |
| 2006/0094506 A1 | 5/2006 | Tarter et al. | |
| 2006/0111967 A1 | 5/2006 | Forbes | |
| 2006/0123053 A1 | 6/2006 | Scannell, Jr. | |
| 2006/0129446 A1 | 6/2006 | Ruhl et al. | |
| 2006/0143158 A1 | 6/2006 | Ruhl et al. | |
| 2006/0167784 A1 | 7/2006 | Hoffberg | |
| 2006/0178918 A1 | 8/2006 | Mikurak | |
| 2006/0195863 A1 | 8/2006 | Whymark | |
| 2006/0212350 A1 | 9/2006 | Ellis | |
| 2006/0218141 A1 | 9/2006 | Tuttle et al. | |
| 2006/0224452 A1 | 10/2006 | Ng | |
| 2006/0230011 A1 | 10/2006 | Tuttle et al. | |
| 2006/0277105 A1 | 12/2006 | Harris | |
| 2006/0287916 A1 | 12/2006 | Starr et al. | |
| 2007/0005424 A1 | 1/2007 | Arauz | |
| 2007/0027743 A1 | 2/2007 | Carson | |
| 2007/0053513 A1 | 3/2007 | Hoffberg | |
| 2007/0061199 A1 | 3/2007 | Montgomery et al. | |
| 2007/0067297 A1 | 3/2007 | Kublickis | |
| 2007/0074258 A1 | 3/2007 | Wood | |
| 2007/0088851 A1 * | 4/2007 | Levkovitz | G06Q 30/02 709/246 |
| 2007/0089129 A1 | 4/2007 | Verhaegh | |
| 2007/0100688 A1 | 5/2007 | Book | |
| 2007/0106760 A1 | 5/2007 | Houh et al. | |
| 2007/0112630 A1 | 5/2007 | Lau et al. | |
| 2007/0143186 A1 | 6/2007 | Apple et al. | |
| 2007/0143345 A1 | 6/2007 | Jones et al. | |
| 2007/0156677 A1 | 7/2007 | Szabo | |
| 2007/0157228 A1 | 7/2007 | Bayer et al. | |
| 2007/0162335 A1 | 7/2007 | Mekikian | |
| 2007/0162926 A1 | 7/2007 | Steelberg et al. | |
| 2007/0192129 A1 | 8/2007 | Fortuna | |
| 2007/0198344 A1 | 8/2007 | Collison et al. | |
| 2007/0219940 A1 | 9/2007 | Mueller et al. | |
| 2007/0239530 A1 | 10/2007 | Datar et al. | |
| 2007/0239535 A1 | 10/2007 | Koran et al. | |
| 2007/0250901 A1 | 10/2007 | McIntire et al. | |
| 2007/0260520 A1 | 11/2007 | Jha et al. | |
| 2007/0266326 A1 | 11/2007 | Evans et al. | |
| 2007/0282684 A1 | 12/2007 | Prosser et al. | |
| 2007/0288309 A1 | 12/2007 | Haberman et al. | |
| 2007/0288431 A1 | 12/2007 | Reitter et al. | |
| 2008/0004947 A1 | 1/2008 | Mathew et al. | |
| 2008/0033587 A1 | 2/2008 | Kurita et al. | |
| 2008/0033736 A1 | 2/2008 | Bulman | |
| 2008/0033776 A1 | 2/2008 | Marchese | |
| 2008/0033790 A1 | 2/2008 | Nickerson et al. | |
| 2008/0033806 A1 | 2/2008 | Howe et al. | |
| 2008/0034314 A1 | 2/2008 | Louch et al. | |
| 2008/0040175 A1 | 2/2008 | Dellovo | |
| 2008/0052541 A1 | 2/2008 | Ginter et al. | |
| 2008/0059275 A1 | 3/2008 | Rockfeller et al. | |
| 2008/0059286 A1 | 3/2008 | Nickerson et al. | |
| 2008/0065491 A1 | 3/2008 | Bakman | |
| 2008/0077574 A1 | 3/2008 | Gross | |
| 2008/0082426 A1 * | 4/2008 | Gokturk | G06F 17/30256 705/26.62 |
| 2008/0086368 A1 | 4/2008 | Bauman | |
| 2008/0086432 A1 | 4/2008 | Schmidtler et al. | |
| 2008/0090551 A1 | 4/2008 | Gidron et al. | |
| 2008/0091516 A1 | 4/2008 | Giunta | |
| 2008/0103886 A1 | 5/2008 | Li et al. | |
| 2008/0109285 A1 | 5/2008 | Reuther et al. | |
| 2008/0120325 A1 | 5/2008 | Davis | |
| 2008/0126178 A1 | 5/2008 | Moore | |
| 2008/0126476 A1 | 5/2008 | Nicholas et al. | |
| 2008/0140502 A1 | 6/2008 | Birnholz et al. | |
| 2008/0154625 A1 | 6/2008 | Serbanescu | |
| 2008/0162281 A1 | 7/2008 | Davis et al. | |
| 2008/0167957 A1 | 7/2008 | Steelberg et al. | |
| 2008/0168135 A1 | 7/2008 | Redlich et al. | |
| 2008/0172293 A1 | 7/2008 | Raskin et al. | |
| 2008/0183806 A1 | 7/2008 | Cancel | |
| 2008/0201734 A1 | 8/2008 | Lyon et al. | |
| 2008/0209001 A1 | 8/2008 | Boyle et al. | |
| 2008/0215474 A1 | 9/2008 | Graham | |
| 2008/0243767 A1 | 10/2008 | Naibo et al. | |
| 2008/0249855 A1 | 10/2008 | Collins | |

(56) References Cited

U.S. PATENT DOCUMENTS

2008/0255936 A1   10/2008  Ghate
2008/0256572 A1*  10/2008  Chen .................. G06Q 30/0251
                                                            725/32
2008/0263583 A1*  10/2008  Heath ..................... G06Q 30/02
                                                            725/32

OTHER PUBLICATIONS

Tong, X., "Creation of Brand Equity in the Chinese Clothing Market," Dissertation, Graduate School University of Missouri-Columbia, Dec. 2006, pp. 1-190.

* cited by examiner

SYSTEM AND METHOD FOR CREATION AND MANAGEMENT OF ADVERTISING INVENTORY USING METADATA

CROSS-REFERENCE TO RELATED APPLICATIONS

This application is a continuation of U.S. patent application Ser. No. 11/981,839, filed Oct. 31, 2007, which is related to U.S. patent application Ser. No. 11/981,838, entitled "VIDEO-RELATED META DATA ENGINE, SYSTEM AND METHOD" filed Oct. 31, 2007, and also related to U.S. patent application Ser. No. 11/981,763, entitled "OPEN API VIDEO SYSTEM AND METHOD OF MAKING AND USING SAME" filed Oct. 31, 2007, all of which are incorporated herein by reference in their entirety.

FIELD OF THE INVENTION

The present invention relates to the creation and management of advertising inventory and relates more particularly to the creation and management of advertising inventory relating to viewable media streams.

BACKGROUND OF THE INVENTION

Various techniques have been used to create and manage advertising in connection with viewable media streams. For example, in the television context, many advertisements utilize "Image" or "Brand" advertising where the main idea is to make the viewer feel good about the associated product or service. Image commercials usually expensive to make and can take a long time to work. On the other hand, "Immediate Response" advertising attempts to get the viewer to take some buying action right now, such as call the advertiser. In some cases the advertisement content is selected based on the general content of the media stream. For example during the broadcast of a major sports event some advertising content may be directed to sports equipment, memorabilia or the like. Similar techniques can be used to generally associate advertising content with media stream content on a general level using other distribution methods such as on-line distribution, video on demand, pay-per view, DVR applications and the like. It would be desirable to provide improved systems and methods that facilitate the creation, management and distribution of advertising inventory relating to viewable audio/visual or media streams.

BRIEF SUMMARY OF THE INVENTION

The invention is directed to a system and method for the creation and management of advertising inventory utilizing associated metadata. The system generally includes a media streaming system that is used with a video player in connection with the playback of at least one audio/video work. The media streaming system includes a media distribution system that supplies metadata associated with the audio/video work to the video player. The metadata has a hierarchical taxonomy that defines a plurality of attributes associated with one or more objects present in the audio/video work. The system also includes an ad inventory engine that determines available ad inventory based on the metadata and matches the available inventory with advertisement data based on the hierarchical taxonomy.

The media distribution system and/or the ad inventory engine can be located at least partially remote from the video player. The metadata may include one or more temporal attributes associated with the object present in the audio/video work. The metadata may include one or more spatial attributes associated with the object present in the audio/video work.

The system can include a communication channel coupled between the media distribution system and the video player. Exemplary communication channels include: satellite communication, radio communication, wired communication, infrared communication, coaxial cable communication, WIFI communication, WiMAX communication, LAN communication, WAN communication, telephonic communication, DSL communication, and Ethernet communication.

The hierarchical taxonomy can include at least three categories of breadth and at least three levels of depth thereby defining attributes of objects contained in the audio/visual work. A portion of the metadata can be automatically associated with objects contained in the audio/visual work. Such automatic association can occur remotely from the video player. In the alternative, the automatic association can occur locally to the video player. In yet another alternative, the automatic association can occur via object recognition software or as part of a crawler that reviews the audio/visual works.

In the alternative, a portion of the metadata can be manually associated with objects contained in the audio/visual work. Such manual association can occur remotely from the video player. In the alternative, the manual association can occur locally to the presenter. The media distribution system and/or the ad inventory engine can be disposed on a computer readable media.

The invention is also directed to an advertising data creation system and method for use in connection with an audio/video work, the system. The system utilizes metadata associated with the audio video work, wherein the metadata has a hierarchical taxonomy that defines a plurality of attributes associated with one or more objects present in the audio/video work. The system also has an ad template engine that identifies a collection of common attributes contained in the metadata and generates advertising data based on the collection of common attributes.

The collection of common attributes may include one of the following, common temporal attributes, common geographic attributes, common hierarchical levels within the hierarchical taxonomy. The metadata may include at least one temporal attribute associated with the object present in the audio/video work. The metadata may include at least one spatial attribute associated with the object present in the audio/video work. The hierarchical taxonomy may include at least three categories of breadth and at least three levels of depth thereby defining attributes of objects contained in the audio/visual work.

The system can include a communication channel coupled between the ad template engine and the database system. Exemplary communication channels can include satellite communication, radio communication, wired communication, infrared communication, coaxial cable communication, WIFI communication, WiMAX communication, LAN communication, WAN communication, telephonic communication, DSL communication, and Ethernet communication.

BRIEF DESCRIPTION OF THE DRAWINGS

For a better understanding of the present invention, reference is made to the following description and accompanying drawings, while the scope of the invention is set forth in the appended claims:

DETAILED DESCRIPTION OF THE INVENTION

It is to be understood that the figures and descriptions of the present invention have been simplified to illustrate elements that are relevant for a clear understanding of the present invention, while eliminating, for the purposes of clarity, many other elements found in typical interactive, metadata, and video play systems and methods. Those of ordinary skill in the art will recognize that other elements are desirable and/or required in order to implement the present invention. However, because such elements are well known in the art, and because they do not facilitate a better understanding of the present invention, a discussion of such elements is not provided herein.

I. System Overview

Figure 1:
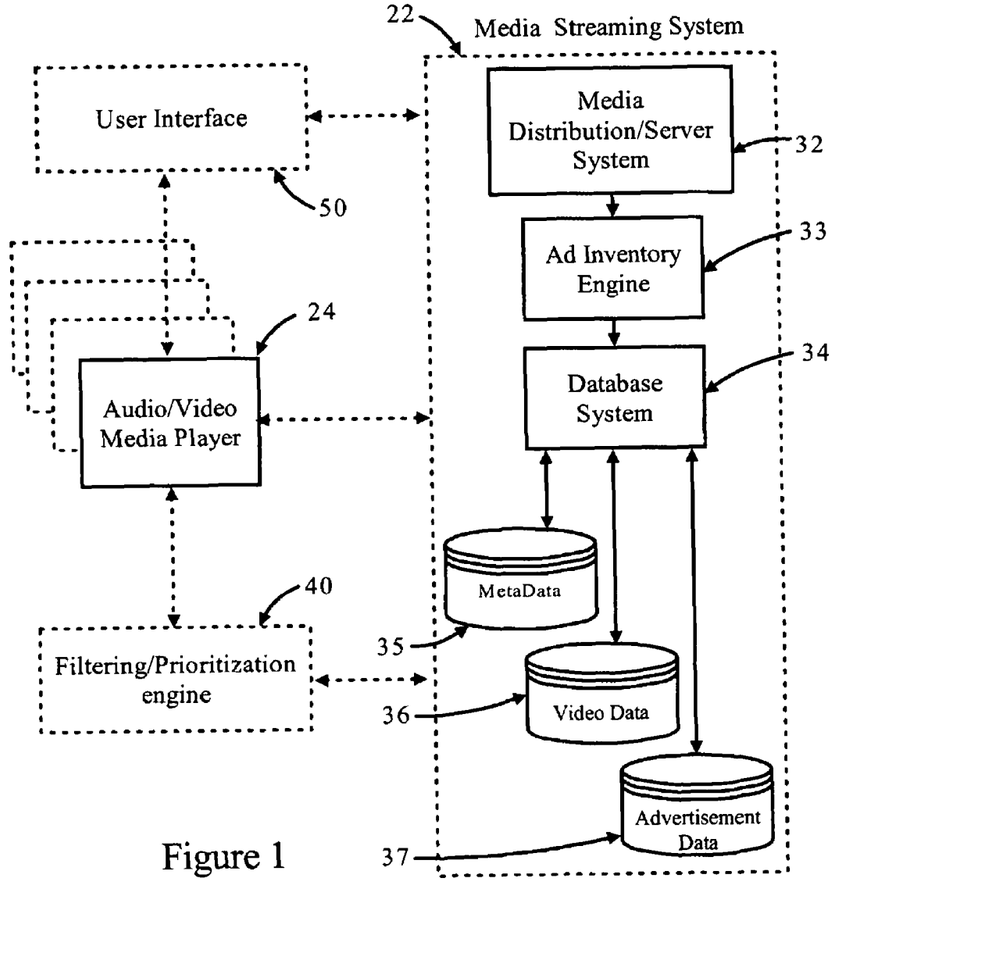
FIG. 1 is a block diagram of an exemplary system in accordance with the invention.

The invention is directed to a system and method for the creation and management of advertising inventory utilizing associated metadata. The invention creates numerous benefits that creates new advertising inventory and improves the marketing potential for existing advertising inventory. FIG. 1 shows an exemplary system diagram in accordance with the invention. The system includes a media streaming system 22 that communicates with one or more audio/video media players 24 (hereinafter video player). Video player 24 can be implemented in a variety of forms and typically includes associated software and hardware for the playing of audio/visual works on the video player (hereinafter video engine).

The video player as discussed herein may include any type of video player that makes use of any video media for playing on the video player, such as, but not limited to, televisions, desktop and laptop computers, personal digital assistants (PDA), personal entertainment devices, such as IPODs, and the like, mobile telephones, etc. The video engine of the present invention operates in conjunction with a video player in order to present audio visual works to a user of the video player. The video engine includes all hardware necessary to execute the playing of the video on the video player, and additionally includes one or more software applications capable of presenting not only audio visual works, but additionally capable of manipulating user interaction with such audio visual works, or manipulating said audio visual works themselves. Such software may interact with the audio visual works via, for example, metadata embedded in the audio visual work, or a metadata stream received by the video player and video engine separately, and or in conjunction with, the audio visual work stream. The video engine, as used herein, may be any such engine capable of receiving audio visual works and instructions associated therewith, and additionally capable of instructing of manipulation of such audio visual works, such as, but not limited to, a digital video recorder, a computer hard drive, a micro processor, or the like. Suitable video players for use in accordance with the invention are described in detail in co-pending application Ser. No. 11/981,763.

Media streaming system 22 includes a media distribution/server system 32, an ad inventory engine 33 and a database system 34. The ad inventory engine generally 33 determines available ad inventory based on, for example, the capabilities of video player and the content of metadata as discussed below. The database system can access a variety of data including metadata shown graphically as block 35, video data shown graphically as block 36 and advertisement data shown graphically as block 37. The system may also include a filtering/prioritization engine 40 and a user interface 50. The media distribution/server system 32 includes all of the required hardware and software to transmit or stream metadata to video player 24 (e.g., televisions, desktop and laptop computers, personal digital assistants (PDA), personal entertainment devices, such as IPODs, and the like, mobile telephones, etc.).

It is understood that audio/visual works, and advertisement data to fill advertising inventory, may come from a variety of sources that are internal or external to the system. The media distribution/server system may also include the required hardware and software to transmit or stream audio/video works and/or advertisement data to the video player 24. To this end, the system can include a communication channel coupled between the media streaming system 22 and the video player 24. Exemplary communications technologies include: satellite communication, radio communication, wired communication, infrared communication, coaxial cable communication, WIFI communication, WiMAX communication, LAN communication, WAN communication, telephonic communication, DSL communication, Ethernet communication, or the like as would be known to those skilled in the art. Needless to say, such advertising data, once received at the video player, may be locally viewed after storage, such as when the proper advertising slot or opportunity does not occur for the passage of some time after receipt of advertising data, may be viewed after processing by the video player and the applications associated therewith, or may be viewed as a stream, in real time, upon receipt.

Metadata as represented by block 35 encompasses any type of computer readable information that may be associated with an audio visual work, or that may be used for interaction thereupon or therewith, as will be understood by one of ordinary skill in the art. Metadata, as used herein, is defined to include any type of executable code, computer language code (such as xml or html, object code and/or source code), or "mash-up" data (program associated data integral with data of interest) that may be associated with or into an audio/visual work. Metadata further includes data created through the use of the present invention and pre-existing data that may be, form part of, or be associated with the audio-visual works on which the present invention is operated. Video data as represented by block 36 includes one or more audio/visual works. Advertisement data as represented by block 37 includes advertisement information in one of a variety of forms for example, text information, audio/visual information or any combination thereof. In operation the system depicted on FIG. 1 provides a context dependent advertisement data to the video player 24 based on the particular audio/visual work being displayed by the video player.

In general, the metadata provides a nomenclatures, which may be, for example, a common hierarchical nomenclature as discussed in more detail below. However additional applications and/or audio/visual filters may be developed to allow access to, interaction with, or reference to particular items, objects, or video portions across all videos created anywhere for play over any media, as well as association of advertising data with any such objects or video portions as advertising inventory. For example, in an exemplary embodiment, a user may access a video filter or video application that allows that user to record, or view, or buy, or the like, by interaction with any reference to an object present in any audio/visual stream, and thereby the user may be presented with advertising associated with any such object as directed by that application or a separate advertising application. Such filters or applications may, of course, attempt to metadata tag only those audio/visual works deemed most likely, such as based on a prioritization filter, to make the requested reference in the audio/visual work, or may crawl across all audio/visual works on all media obtainable to the video engine via any media accessible over a communication channel via a communication access point.

Of course, even using the video engine describer above in connection with a common nomenclature across consistent objects among all video works, the task of assessing a particular object or objects across a great many video works may be overwhelming. Thus, the video engine of the present invention may be programmed with the aforementioned prioritization filter, whereby, based on a user type of the video engine user, the prioritization filter prioritizes the level of the hierarchy at which review is best to occur, the media type over which review of audio/visual works is best to occur, or the type of communication access point that the most desired customers have the highest likelihood of using, for example. Thus, the video engine may make use of empirical data in the application of the nomenclature hierarchy to arrive at the most desired result of nomenclature assignment for any particular application.

II. Hierarchical Taxonomy Overview

The invention utilizes a hierarchical taxonomy, which may make common, or substantially common, reference to items within audio visual works across audio visual works and across interactivity planes. Thus, in an exemplary embodiment of the present invention, every object in every audio/visual work may be assigned a nomenclature having criteria at different levels of such nomenclature, with such nomenclature and nomenclature at such levels, in certain exemplary embodiments, being common across all audio visual works in accordance with the metadata indicative of each item in each such audio visual work. In fact, the metadata associated with each such audio visual work is then built, such as by manual entry for object recognition, to use the proper nomenclature for each object within the work upon every reference to that object across all audio visual works making reference to that object. For example, the hierarchy may include any number of top level topics or categories, such "fashion", "automotive", "health and leisure", "professional sports" and the like. Needless to say, the present invention is by no means limited to the aforementioned list, and in fact includes top level hierarchal nomenclature in each category of an object that may appear in an audio/visual work, as will be apparent to those skilled in the art, with a particular view of those items in a video play that might be of most interest, such as to a consumer or advertiser, as will also be apparent to one or ordinary skill in the art.

Figure 2:
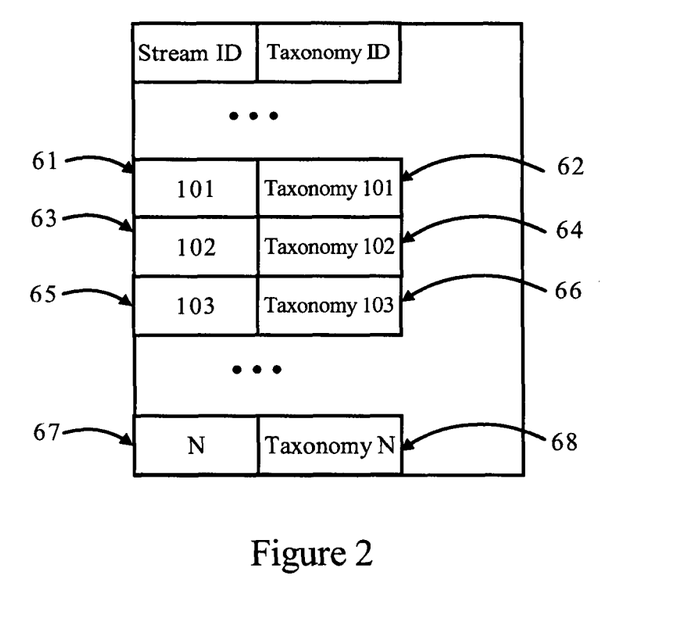
FIG. 2 shows an exemplary high-level metadata structure in accordance with the invention.

In the current example, the system may, for example, store a hierarchical taxonomy for each audio/visual work in Extensible Markup Language or XML format. It is understood that other file formats, e.g., flat file, database file and the like can be used to store the hierarchical taxonomy without departing from the scope of the invention. FIG. 2 shows an exemplary metadata structure. In this example, each audio/visual work or stream is assigned a unique ID and is associated with a hierarchical taxonomy. For example, stream ID number 101 is associated with Taxonomy 101 (blocks 61, 62), stream ID number 102 is associated with Taxonomy 102 (blocks 63, 64), stream ID number 103 is associated with Taxonomy 103 (blocks 65, 66), stream ID number N is associated with Taxonomy N (blocks 67, 68). As is well known in the art, XML, uses a self-describing and simple syntax. Each element begins with an opening tag and ends with a closing tag that includes the "/" prefix. Elements may have one or more nested sub elements. An exemplary segment of sample XML code pertaining to a particular taxonomy appears below.

```
<FashionGroup>
    <Object1>suits</Object1>
        <Object1_1>men's</Object1_1>
        <Object1_2I>Italian</Object1_2>
        <Object1_brand>generic</Object1_brand>
    <Object1_Time>45</Object1_Time>
    <Object1_Coord>Q1</Object1_Coord>
    <Object2>dresses</Object2>
        <Object2_1>evening</Object2_1>
        <Object2_brand>generic</Object2_brand>
    <Object2_Time>355</Object2_Time>
    <Object2_Coord>R</Object2_Coord>
    <Object3>shoes</Object3>
        <Object3_1>women's</Object3_1>
        <Object3_2>pumps</Object3_2>
        <Object3_brand>Brand_XYZ</Object3_brand>
    <Object3_Time>355</Object3_Time>
    <Object3_Coord>Q4</Object3_Coord>
</FashionGroup>
```

In this example above, the sample XML code is defined by a series of elements associated with (i.e., nested under) the "FashionGroup" tag. As is readily apparent, the FashionGroup element includes several child elements pertaining to fashion related objects that are present in the associated audio/visual work. One such element is delimited by the Object 1 XML tag, so named because it contains information related to the appearance of a specific object in the associated audio/visual stream (in this case a suit). The various sub elements or child elements contain further information relating to the suit such as sub element Object1_1 is set to "men's" and sub element Object1_2 is set to "Italian." In this example, the brand of the suit is not known so the Object1_brand tag is set to "generic." The "Object1_Time" tag contains a time value that can be utilized by the system to locate the specific time the suit will appear in the audio/visual work. In this example the Object1_Time tag is set to 45 seconds, referenced to the beginning of the stream. It is understood that a variety of time stamping techniques and/or notations can be used without departing from the scope of the invention. Aside from tracking the temporal information, the metadata can also track spatial information relating to the object in question. For example, the viewable area of the audio/visual work as it is displayed on the video player can be divided into segments, portions, quadrants or the like (e.g., Q1=upper left quadrant, Q2=upper right quadrant, Q3=lower left quadrant, Q4=lower right quadrant, L=left side, R=right side, C=center, U=upper portion, Lw=lower portion). It is understood at a wide variety of coordinate descriptions could be used without departing from the scope of the invention. In this example, the "Object1_Coord" tag is set to "Q1" denoting that the object is located in the upper left portion. It is also readily apparent that a wide variety of elements and sub elements can be created to define some or all of the fashion related objects that are present in a given audio/visual work.

Continuing with the example above, the Object 2 element is set to "dresses". Sub element Object2_1 is set to "evening" and the Object2_brand tag is set to "generic." In this example the Object2_Time tag and the Object2_Time tag are set to 355 seconds denoting the time at which Object2 and Object3 will appear in the audio/visual work. The "Object2_Coord" tag is set to "R" denoting that the object is located on the right side of the audio/visual work. Object3 is set to "shoes" and Object3_1 is set to "women's" and Object3_2 is set to pumps. In this case the brand of the shoes is known so the Object3_brand tag is set to "Brand_XYZ." The "Object3_Coord" tag is set to "Q4" denoting that the object is located in the lower right quadrant of the audio/visual work.

It is understood that the aforementioned example is in no way limiting, but rather the importance of the aforementioned list lies in the fact that the nomenclature in each of the hierarchal categories within the hierarchical taxonomy is not varied, with respect to its metadata application to objects and portions within audio/visual works, nor is it varied across audio/visual works. Based on the foregoing it is readily apparent that a wide variety of levels can be created in the hierarchical taxonomy covering some or all of the objects within audio/visual works and/or across multiple audio/visual works.

In an exemplary embodiment of the present invention, one, several, or every object in every audio/visual work, and/or one or more portions or topics of portions of one or more audio/visual works, may be assigned a set nomenclature to reference such object(s) at each of different levels of a hierarchy, with such nomenclature, and nomenclature at such levels, in certain embodiments being common across all audio/visual works in accordance with the metadata indicative of each object or portion, as referred to at each such hierarchical level, in each such audio/visual work.

The metadata associated with each such audio/visual work can be built by a variety of methods. For example by manual entry after review of the audio/visual work, or by automated object (audio and/or video and/or character) recognition, which may employ a "crawler" to review many audio/visual works, to use the proper, common nomenclature for each object or portion within and of the work upon every reference to that object or portion across all audio/visual works making reference to that object or portion.

III. Advertising Inventory Creation

As noted above, the ad inventory engine 33 of the invention utilizes a hierarchical taxonomy for making reference to items within audio/visual works. The hierarchical taxonomy generally includes information that identifies the object as well as spatial and temporal information related to that object. This allows for the "multi-dimensional" creation of advertising inventory around each and every object specified in the hierarchical taxonomy. As used herein, multi-dimensional may include one or more of time, spatial location, context, frequency of reference, what number out of such frequency of reference (i.e. 1 of 8 references to a particular object). The terms "ad inventory" or "advertising inventory" as they are used herein encompass the multi-dimensional opportunities into which an advertisement can be placed based on the multi-dimensional creation of advertising inventory. In the context of traditional broadcast television, ad inventory is typically limited to a collection of time slots that are aired between program segments. In an on-line context prior to the present invention, ad inventory has been used to refer to the number of page views, banner locations, pop-up windows and the like that a site has available for advertising.

Examples of ad inventory creation are readily apparent from the discussion of metadata above. For example, Object 1 is an Italian men's suit. Certain advertisers (e.g., men's clothing and/or accessories manufactures, retailers and the like) may desire the placement of an appropriate advertisement temporally with the appearance of Object1. Thus this object can be utilized to create ad inventory relating to that object. The specific timing and nature for the advertisement will depend on the preference of the advertiser, the applications associated with the video player for playing such advertisement, and/or on the capabilities of the video player. For example, some players and/or applications may allow for a pop up window so that audio/visual advertising can be placed on the video player display in the form of an overlay, a watermark, an applet, a banner or the like. Further, for example, inasmuch as spatial information is available, the play can also support an overlay over a portion of the audio/visual in which the object with which the advertisement is to be associated appears. However, in this event, it is desirable to locate the overlay so that the object at issue (e.g., Object1) is not obstructed by the overlay (of course, if an advertiser wished to advertise that object, such as by linking to a plurality of external advertising-type information available via an application based on a viewer interaction with that object, the advertiser would not want that object blocked by a presentation of the application providing the advertisement). Some video players may also, for example, support a ticker function so that text-based advertisements may be scrolled across a portion of the video player display without interference with the display.

Depending on the particular level of the hierarchy, more specific references may or may not be employed based on the intended use of the audio/visual work. For example, a consumer who watches audio/visual words may wish to employ the nomenclature to access video snippets, which may be or include advertisements, such as for apparel or tickets, based on references to that consumer's favorite baseball team. In such a case, the initial hierarchy employed by the application that accesses, using associated metadata, particular video snippets may be "professional sports", the sub-category may be "major league baseball", and a specific reference may be "Philadelphia Phillies". No additionally specific references may be necessary for such a use, and thus may not be provided by the party generating the metadata, although other deeper sub-categories, such as player names, field names, positional data, former player, etc. may be available in the nomenclature hierarchy for use in other advertising applications requiring such depth.

As an example of use of the deeper hierarchy, in the event that an advertiser wishes to make use of the engine of the present invention, more specific hierarchy levels may be employed by an advertiser application using the metadata associated with the audio/visual work. For example, in the event of a hierarchical reference to "purses", Gucci may wish to advertise its own brown purses in certain cases when the object purse is shown in an audio/visual work, but only a very specific purse. Thus, advertisers may make use of more specific hierarchy levels, such as, under the sub-category of "purses", categories for "Gucci" purses, and then "brown" Gucci purses (of course other purse colors, types of Gucci purses, model years of Gucci purses, etc., may be made of use at this level of the hierarchy), leading to the reference, by the metadata, to an advertisement external to the audio/visual work (which may be accessible locally or over one or more of the communication access points) only in the event the viewer of the audio/visual work interacts with a brown, Gucci purse object. Needless to say in light of the disclosure herein, the nomenclature hierarchy of the present invention may include a translator, whereby the nomenclature of one human language (or computer language) is precisely and consistently translated into the common terminology of another language, with no loss of commonality in any language.

Therefore, although different levels of the nomenclature hierarchy may be employed by different users of audio/visual works, or by different applications associated via the metadata with the audio/visual works, the hierarchal nomenclature references employed may be, or be substantially, the same at any respective level across all users, across all audio/video works, and across all items, objects or video portions of that type. Of course, this aspect of the present invention makes available a number of advantageous presentations for association with audio/visual works. For example, in the exemplary embodiment discussed above, Gucci may wish to place an overlay advertisement in the lower right hand corner of any audio/visual work making reference to purses, or may wish to place an overlay advertisement only with respect to those audio/visual works that make reference to brown purse, or only brown, Gucci purses.

IV. System Operation

Figure 3:
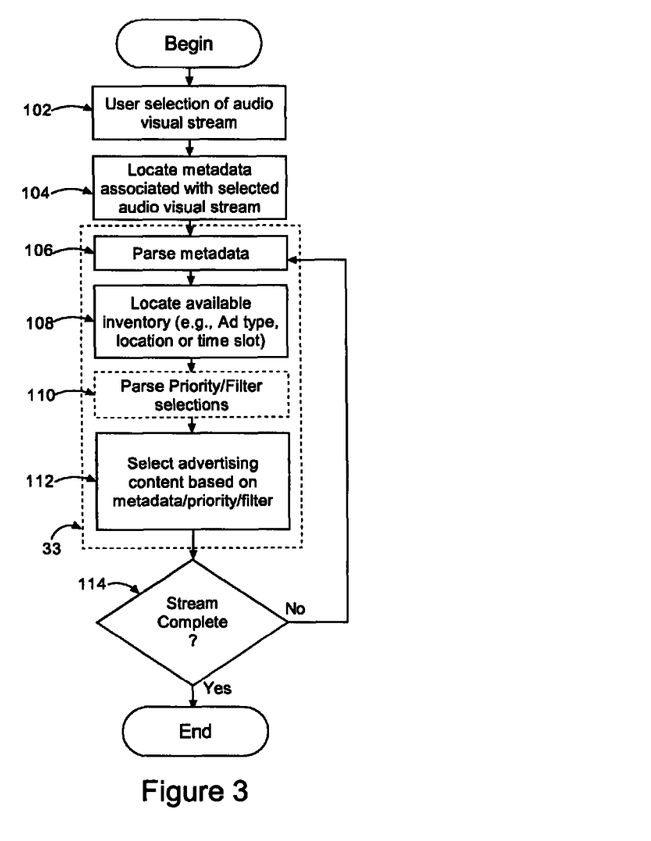
FIG. 3 exemplary flowchart showing system operation in accordance with the invention.

In general, the invention is directed to a system and method for creation and management of advertising inventory utilizing associated metadata. FIG. 3 shows an exemplary flowchart showing system operation in accordance with the invention. It is understood that the order of execution can be varied without departing from the scope of the invention. It is also understood that the flowcharts contained herein are illustrative only and that other program entry and exit points, time out functions, error checking routines and the like (not shown) would normally be implemented in typical system software. It is also understood that some of the individual blocks may be implemented as part of an iterative process. It is also understood that the system software can be implemented to run continuously. Accordingly any beginning and ending blocks are intended only to indicate logical beginning and ending points for purposes of this disclosure.

In general, system operation begins with the user selection of a audio/visual stream for viewing as shown by block 102. It is understood that the invention is applicable to a variety of distribution methods for audio/visual works. In some cases, it may be advantageous for the player to carry out some of the processing set forth in FIG. 3 (e.g., in an on-line distribution scenario), in other cases, portions of the processing can be handled by the media streaming system 22 (FIG. 1) which for example can be located at the distribution point, cable head end or the like (e.g., in the cable TV scenario). Once the audio/visual stream is selected the system locates the metadata associated with the selected stream as shown by block 102. It is understood that the metadata can be stored locally or remotely. Once the associated metadata is located, the metadata can be parsed as shown by block 106 so that the system can locate all available objects, and their attributes (e.g., physical attributes, temporal, spatial . . . ). The system can also locate available ad inventory (e.g., via ad inventory engine 33) as shown by block 108. The available ad inventory depends not only on the metadata but also the capabilities of the video player and application(s). It is understood that the video player capabilities can be transmitted to the media streaming system 22 in cases where such capabilities are not already known to the media streaming system. As noted above, the system can optionally employ prioritization and/or filtering represented by block 110.

Once a particular advertisement is matched with available inventory, such as via a general application, an advertising application, or an advertiser-specific advertising application, the advertisement is provided to the video player for display to the user as shown by block 112. It is understood that 106-112 can be carried out via the ad inventory engine 33 (FIG. 1). This process set forth in FIG. 3 can be repeated thought the playback of the audio/visual work as shown by block 114. It is readily apparent many variations are possible without departing from the scope of the invention. For example, the metadata can be parsed in advance of the playback of the audio/visual stream. In this case the system can determine all of the available advertising inventory in advance. The system can also match the ad inventory to available advertisements in advance of the playback of the audio/visual work.

V. Advertisement Data Creation

As discussed above, one aspect of the invention relates to the creation and management of ad inventory. The invention also encompasses the creation of advertisement data utilizing a hierarchical taxonomy for making reference to items within associated audio/visual works. As discussed above, the metadata can include attributes relating to products and/or services that appear in the associated audio/visual work. It is understood that the range of such products or services is virtually unlimited. Such products or services can be endorsed or unendorsed by associated actors or characters present in the audio/video work. The system may also generate targeted ad data that relates to particular demographics or even individuals. In such cases the system may also access additional information external to the metadata, for example from the video player to assist in targeting such ad data. For example, a user may request playback of a particular audio/visual work. The system may access the user's account information in order to identify information relevant to the video player user (e.g., geographic location, prior history, preferences and the like). In some cases an audio/visual work may contain a geographic elements that have corresponding elements defined in associated metadata. Such elements could include a city skylines, landmarks, natural and man-made monuments, street signs identifying particular cities, states, towns, countries and the like. It is understood that the invention can generate ad data relating to such elements and external data thereby identifying a collection of common elements that are present in the audio/video work.

Figure 4:
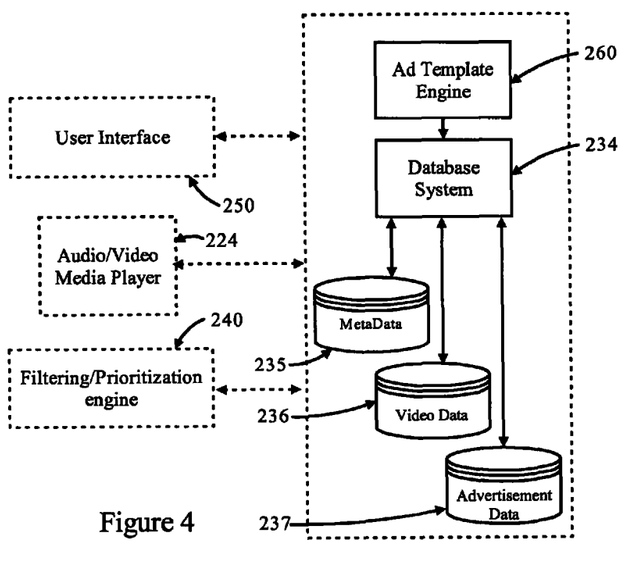
FIG. 4 is a block diagram of an exemplary system in accordance with the invention.

FIG. 4 shows an exemplary system diagram in accordance with the invention. The system includes an ad template engine 260 and a database system 234. The ad template engine generally parses the metadata and generates advertisement data for use in preparing advertisements and ultimately filling ad inventory. The database system may access a variety of data including metadata shown graphically as block 235, video data shown graphically as block 236 and advertisement data shown graphically as block 237. The database system or ad template engine may also communicate with a video player as shown by block 224, thereby gaining access to external data relating to the individual using the videoplayer. The system may also include a filtering/prioritization engine 240 and a user interface 250. In general, the ad template engine 260 includes all of the required hardware and software to read/parse metadata, locate common attributes and generate advertisement data based on the common attributes.

Figure 5:
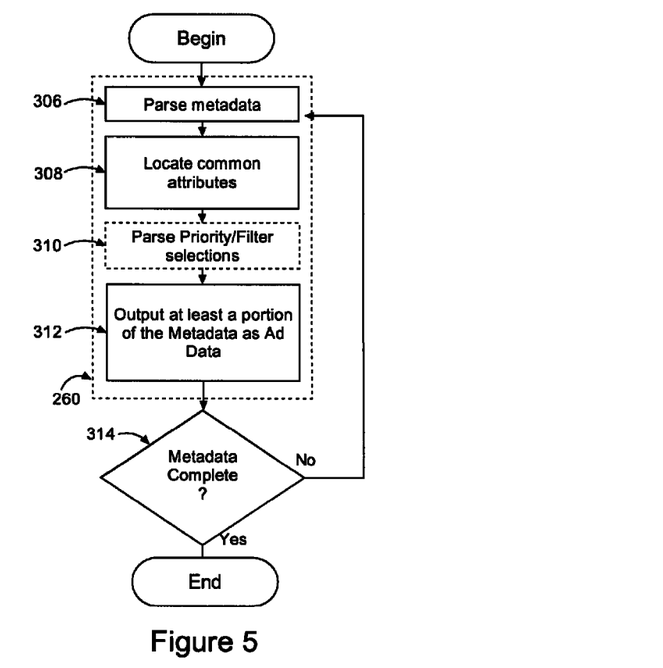
FIG. 5 exemplary flowchart showing system operation in accordance with the invention.

FIG. 5 shows an exemplary flowchart showing system operation in accordance with the invention. In general, system operation begins with the reading or parsing of metadata as shown by block 306. It is understood that the metadata can be stored locally or remotely. The system can locate all available objects and compile a collection of attributes having some form of commonality as shown by block 308. For example, the system can identify elements having common temporal attributes, common geographic attributes, common taxonomy levels and the like. In some cases, the user may wish to utilize a filter to limit the dataset to specific categories of information or taxonomy levels as shown by block 310. For example, in an exemplary embodiment, a user may utilize filter or application that allows that limits the dataset to elements that have a relationship to specific actors or characters present in the audio/video work, geographic areas, time period, taxonomy levels (e.g., fashion, automotive, health and leisure, professional sports . . . ). Once the system identifies a group of common attributes, the system can output this portion of the metadata for use as ad data. This process set forth in FIG. 5 can be repeated thought the reading or parsing of the metadata as shown by block 314. It is readily apparent many variations are possible without departing from the scope of the invention.

While the foregoing description and drawings represent the exemplary embodiments of the present invention, it will be understood that various changes and modifications may be made without departing from the scope of the present invention.

What is claimed is:

1. A media streaming system for streaming an audio/video work, the system comprising:
   a media server configured to stream data of an audio/video work;
   a video player configured to receive the streamed data of the audio/video work from the media server and to display the audio/video work on a display; and
   an ad inventory engine having advertisement data, wherein the media server is configured to send metadata associated with the audio/video work to the ad inventory engine, wherein the metadata has a hierarchical taxonomy that defines a plurality of attributes associated with one or more objects being presented in the audio/video work, wherein one of the plurality of attributes comprises spatial and temporal information of the one or more objects, wherein the ad inventory engine is configured to:
   receive capability information from the video player;
   determine available ad inventory based on the received metadata and to match the available inventory with the advertisement data based on the hierarchical taxonomy comprising spatial and temporal information and the capability information of the video player; and
   provide matched advertisement inventory to the video player for display on the display, wherein the video player is configured to position an ad from the provided-matched advertisement inventory based on the spatial information of the one or more objects, and wherein the spatial information divides the display into four quadrants and a plurality of spatial positions within each quadrant.

2. The system of claim 1, wherein at least one of the media distribution system and the ad inventory engine is at least partially remote from the video player.

3. The system of claim 1 comprising a communication channel coupled between the media distribution system and the video player, wherein the communication channel is selected from the group consisting of satellite communication, radio communication, wired communication, infrared communication, coaxial cable communication, WIFI communication, WiMAX communication, LAN communication, WAN communication, telephonic communication, DSL communication, and Ethernet communication.

4. The system of claim 1, wherein the hierarchical taxonomy comprises at least three categories of breadth and at least three levels of depth thereby defining attributes of objects contained in the audio/visual work.

5. The system of claim 1, wherein at least a portion of the metadata is automatically associated with objects contained in the audio/visual work.

6. The system of claim 5, wherein the automatic association occurs remotely or locally from the video player.

7. The system of claim 5, wherein the automatic association occurs via object recognition software, wherein the object recognition software is employed as part of a crawler that reviews the audio/visual works.

8. The system of claim 1, wherein at least a portion of the metadata is manually associated with objects contained in the audio/visual work.

9. The system of claim 8, wherein the manual association occurs remotely or locally from the video player.

10. The system of claim 1, further comprises a prioritization filter configured to prioritize advertisement for display from the matched advertisement inventory.

11. The system of claim 1, wherein the four quadrants comprise an upper-left quadrant, an upper-right quadrant, a lower-left quadrant, and a lower-right quadrant, and wherein the spatial position within each quadrant comprises right side, left side, upper portion, lower portion, and center portion.

* * * * *